E. BAUSCH & W. L. PATTERSON.
MICROSCOPE.
APPLICATION FILED AUG. 31, 1906.
949,749.
Patented Feb. 22, 1910.
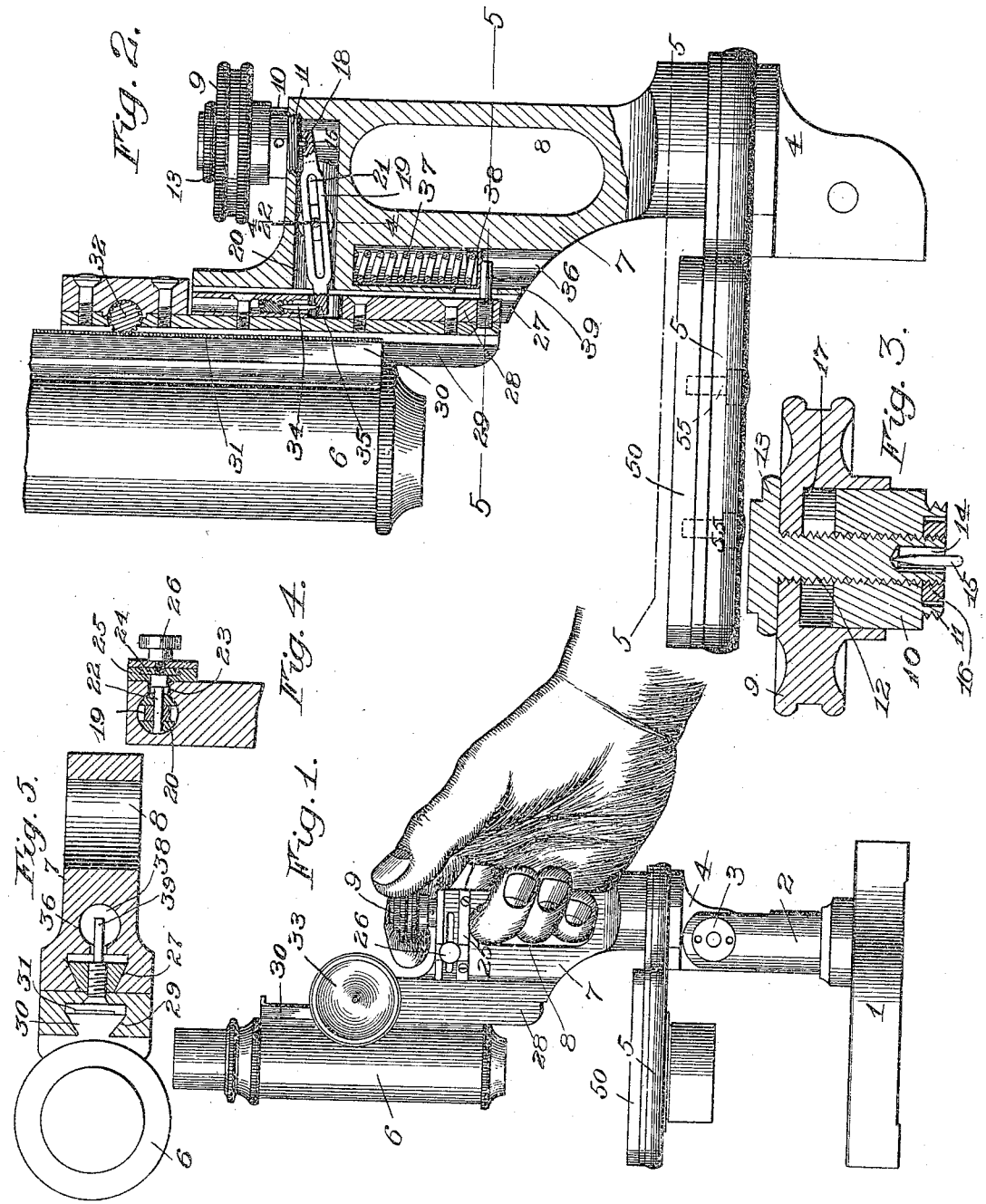
Witnesses
Walter B. Payne
Russell B. Griffith
Inventors
Edward Bausch and
William L. Patterson
By Church & Rich
their Attorneys

UNITED STATES PATENT OFFICE.

EDWARD BAUSCH AND WILLIAM L. PATTERSON, OF ROCHESTER, NEW YORK, ASSIGNORS, BY MESNE ASSIGNMENTS, TO BAUSCH & LOMB OPTICAL COMPANY, (No. 2,) A CORPORATION OF NEW YORK.

MICROSCOPE.

949,749.
Specification of Letters Patent.
Patented Feb. 22, 1910.

Application filed August 31, 1906. Serial No. 332,739.

*To all whom it may concern:*

Be it known that we, EDWARD BAUSCH and WILLIAM L. PATTERSON, of Rochester, in the county of Monroe and State of New York, have invented certain new and useful Improvements in Microscopes; and we do hereby declare the following to be a full, clear, and exact description of the same, reference being had to the accompanying drawings, forming a part of the specification, and to the reference-numerals marked thereon.

Our present invention relates to improvements in microscopes, and it has for its object to provide an improved microscope which is so formed and constructed as to facilitate its handling by the operator during transporting from place to place as well as during the various manipulations attendant upon the examination of specimens, and also to provide an improved fine adjustment which is particularly adapted for use on a microscope of the improved type, whereby the convenience as well as accuracy and steadiness is insured during the adjusting operation, these objects being accomplished without changing the position of the fine adjustment screw from that in the ordinary form, thus obviating any inconvenience on the part of the observer which would be caused by a different arrangement.

To these and other ends the invention consists in certain improvements and combinations of parts, all as will be hereinafter more fully explained, the novel features being pointed out in the claims at the end of the specification.

In the drawings: Figure 1 is a side elevation of a microscope constructed in accordance with our present invention, illustrating a convenient manner of holding and steadying the instrument while the fine adjustment screw or head is being operated. Fig. 2 is an enlarged vertical section through the microscope, showing the fine adjustment employed in the present embodiment of the invention. Fig. 3 represents a section through the screw or head for the fine adjustment. Fig. 4 is a section on the line 4—4 of Fig. 2, and Fig. 5 is a sectional view on the line 5—5 of Fig. 2.

Similar reference numerals in the several figures indicate similar parts.

Microscopes are so delicate in construction that unless extreme care is exercised while they are being moved from one place to another, they are liable to become damaged.

It is the purpose of our present invention to so form and construct the microscope that it may be readily and securely grasped and moved from one place to another such as in a laboratory during the examination of numerous specimens, without the possibility of disturbing the fine adjustment or affecting the efficiency thereof in any manner.

The microscope forming the present embodiment of our invention comprises a base 1 having a post 2 thereon, the latter being preferably provided with a pivot or hinge member 3 to coöperate with the corresponding pivot or hinge member 4 of the upper section of the microscope in order that the optical axis of the microscope may occupy vertical or horizontal positions and angular adjustments intermediate of the vertical and horizontal, as have been used on microscopes of the universal type.

The upper adjustable section of the microscope shown embodies a suitable support for the stage 5 on which specimens for examination are placed, the lens tube 6 arranged above and in optical alinement with the stage, and a standard 7 supporting the lens tube and its adjusting devices, and forming that portion of the microscope adapted to be grasped by the hand of the operator in handling the instrument. The most certain and secure grip may be obtained by hand by forming a vertical slot 8 in this standard to admit the fingers of the operator's hand, this slot being preferably of a length sufficient to receive three of the operator's fingers, leaving the thumb and forefinger of the same hand free to manipulate the screw or head for the lens adjustment, the standard thus forming a handle for the convenient grasp of the fingers of the hand.

The micrometer screw or operating head 9 for the fine adjustment of the lenses is arranged on the standard immediately above and substantially in vertical alinement with the finger-receiving slot of the handle, as this enables it to be rotated or operated easily in either direction by the natural movement of the thumb and forefinger of the same hand grasping the handle of the instrument. Any preferred form of adjustment may be employed, that shown in the present embodiment of the invention being especially adapted for use in combination with a lens support or standard of the kind hereinbefore described, the knurled head 9 being of suitable form and having a sleeve 10 revolubly mounted therein, the latter being provided with an exterior thread 11 adapted to fit and coöperate with the threads in the top of the standard, and having an interior thread of reverse pitch to receive the correspondingly threaded screw 12, the latter being suitably fixed to the head 9 such as by the lock nut 13, and having an axial bore 14 to receive the operating pin 15, a shoulder or collar 16 on the screw serving to limit the movement of the latter in one direction while the sleeve is arranged to coöperate with the shoulder 17 of the operating head to limit the adjustment in a reverse direction.

The operating pin is preferably formed with a conical or pointed end to coöperate with a corresponding seat formed at the upper end of the bore in the screw 12, and the lower end of this pin rests in a recess 18 formed in one end of a lever 19 located within a recess 20 in the upper part of the standard, and having a slot 21 extending longitudinally thereof, through which passes a pivot pin 22.

The pin 22 passes through a slot 23 at the side of the standard and is attached to a block 24 mounted to slide in the guide plate 25, a thumb nut 26 threaded on an extension of the pin 22 serving to secure the pin in any desired position.

In the front of the standard is formed a dove-tail groove 27 to receive the vertically-adjustable slide 28, the latter in turn being provided with a dove-tail groove 29 to receive a correspondingly formed rib 30 rigidly attached to the lens tube 6, the rib on the latter having a rack 31 thereon arranged to coöperate with a pinion 32 journaled in the slide 28 and having the milled heads 33 for operating it, the rack and pinion comprising the coarse or rough adjustment between the slides 23 and the lens tube by means of which the latter may be readily brought into approximately focused position. The fine adjustment forms a connection between the slide and the standard, and at the rear of the slide is mounted a pin 34 attached to the slide and having its lower end rounded or conical shaped to rest in a recess 35 formed in the forward end of the lever. The pin is preferably mounted in a pocket in the slide so that the end of the lever acts in a line between the diverging faces of the slide and in this manner prevents the diverging faces binding against the converging guide faces of the standard.

A bore or recess 36 is also formed in the standard to receive a helical spring 37, the latter resting at one end against the upper end of the bore while its lower end rests against a seat or follower 38, and this follower is suitably attached, as by the laterally extending pin or screw 39 to the slide 23 the pin or screw working through a slot in the standard. This spring normally operates to lower the slide and its attached parts, and in this way, the pins 15 and 29 will be held in coöperative relation with the lever and the adjusting screw and slide respectively, and without the necessity of permanently connecting these parts, and of course when the screw is turned in the direction for lowering the slide, and the lenses carried thereby, the spring will produce the lowering movement in such a way that there will be no unsteadiness due to lost motion, the movements of the lever and the slide connected to it through the pin 34 being accomplished by the screw in the adjusting head which is connected to the lever by the pin 15, and lost motion between these parts and in the screw is prevented at all times by the spring operating as described.

By shifting the pivot pin 22 toward the thumb screw 9 a more rapid motion can be transmitted to the slide 28, and by shifting said pivot in the opposite direction a slower motion is imparted to the slide, which would be desirable in some instances.

By providing a microscope with a handle having a slot into which the fingers of the operator may be inserted, a certain and convenient grasp is provided for the hand that will prevent tilting or overturning of the instrument in any direction, even without requiring a tight grip of the hand on the handle, and by arranging the lens-adjusting head in coöperative relation with the handle, the adjustment of the lenses may be effected with the greatest convenience and while the instrument is steadied by the hand of the operator, so that the observation of the specimen during the focusing operation need not be disturbed.

Of course it will be understood that the operating devices between the adjusting screw and the lens tube may be of different construction, but the lever arrangement enables the adjusting screw to be arranged out of alinement with the lens adjusting slide and in coöperative relation with the handle formed on the standard, and it transmits the movement from the screw directly to the slide without binding action of the latter so that the standard may be made substantial, and the slide for the fine adjustment is arranged close to the optical center of the tube, and this effectually prevents relative turning movement between the standard and the lens tube and partially avoids all looseness and binding action in the slides.

We claim as our invention:—

1. In a microscope, the combination with a lens tube and a slide on which it moves, provided with a pocket, of a standard having a guide groove in which the slide works, an operating lever pivotally mounted upon the standard and having one end projecting into the groove and into the pocket of the slide, and a pin arranged in the pocket and forming a universal connection between the lever and the slide.

2. In a microscope, the combination with a suitable base, and a lens tube, of a standard supported on the base, a slide mounted on the standard and serving as an adjustable support for the lens tube, an adjusting device offset out of alinement with the slide, a lever pivoted to the standard, and pins forming universal connection between said lever and the slide and operating device respectively.

3. In a microscope, the combination with a suitable base, a lens tube, and a standard supported on the base, of a slide mounted to operate on said standard and having a connection with the lens tube, an adjusting screw arranged out of alinement with said slide, a lever pivoted to the standard and having depressions or recesses toward each end, and pins resting in the corresponding recesses of the lever and having their opposite ends engaging the slide and the adjusting screw respectively.

4. In a microscope, the combination with a suitable base, a standard, and a lens tube adapted to be supported by the latter, of a slide mounted to operate on said standard and serving as an adjustable support for the lens tube, an adjusting device, a lever pivoted to the standard, pins for the slide and adjusting device having their ends adapted to rest against said lever, and a spring normally operating to move the slide in a given direction and serving to retain the said pins in coöperative relation with the lever.

EDWARD BAUSCH.
WM. L. PATTERSON.

Witnesses:
WM. G. WOODWORTH,
H. C. THON.